US007789921B2

(12) United States Patent
Thurin et al.

(10) Patent No.: US 7,789,921 B2
(45) Date of Patent: Sep. 7, 2010

(54) PORTABLE DEVICES FOR MITIGATING ACCUMULATION AND LOCALIZED SETTLING OF AIRBORNE PARTICULATES

(75) Inventors: Matthew N. Thurin, Wauwatosa, WI (US); Michael J. Maloney, Madison, WI (US); Jeremy F. Knopow, Burlington, WI (US); Kevin L. Askling, Madison, WI (US); René Maurice Béland, Waterford, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 576 days.

(21) Appl. No.: 11/754,584

(22) Filed: May 29, 2007

(65) Prior Publication Data

US 2007/0277487 A1 Dec. 6, 2007

Related U.S. Application Data

(60) Provisional application No. 60/809,254, filed on May 30, 2006.

(51) Int. Cl.
*B01D 39/00* (2006.01)

(52) U.S. Cl. ............................ 55/282; 55/410; 55/413; 55/417; 55/337; 55/467; 55/471; 55/472; 55/473; 95/273; 95/268

(58) Field of Classification Search .................. 55/467, 55/471, 472, 473, 337, 410–417; 95/273, 95/268
See application file for complete search history.

(56) References Cited

U.S. PATENT DOCUMENTS

| | | | | |
|---|---|---|---|---|
| 4,121,916 | A | 10/1978 | Fricke | |
| 4,214,882 | A | 7/1980 | Brenholt | |
| 4,272,261 | A | 6/1981 | Lynch, Jr. et al. | |
| 4,385,911 | A * | 5/1983 | Popeil et al. | 96/131 |
| 4,526,592 | A * | 7/1985 | Armbruster | 96/121 |
| 4,846,859 | A | 7/1989 | Nobiraki et al. | |
| 5,069,691 | A | 12/1991 | Travis et al. | |
| 5,100,445 | A * | 3/1992 | Johnson et al. | 55/413 |
| 5,230,723 | A | 7/1993 | Travis et al. | |

(Continued)

FOREIGN PATENT DOCUMENTS

JP 55039224 A 3/1980

(Continued)

OTHER PUBLICATIONS

PCT/US2007/069876 International Search Report and Written Opinion dated Oct. 26, 2007.

*Primary Examiner*—Jason M Greene
*Assistant Examiner*—Dung Bui

(57) ABSTRACT

Portable devices for mitigating the accumulation and localized settling of airborne particulates are provided. The devices establish airflow patterns which push or carry various airborne particulates outwardly away therefrom, thereby establishing a localized zone having relatively fewer airborne particulates. Correspondingly, each the devices establishes a localized zone, defined circumferentially about the perimeter of the device, in which there is relatively less surface accumulation of particulates which were previously airborne and settled out. The devices establish such airflow patterns by proving a fan which draws a volume of air axially through a top portion of the device, then pushes the volume of air axially down through the device where it is radially emitted from the bottom portion of the device, defining a circumferentially expanding plane of airflow.

12 Claims, 7 Drawing Sheets

U.S. PATENT DOCUMENTS

| | | | | |
|---|---|---|---|---|
| 5,240,478 | A * | 8/1993 | Messina | 95/273 |
| 5,268,009 | A | 12/1993 | Thompson et al. | |
| 5,358,443 | A | 10/1994 | Mitchell et al. | |
| 5,399,319 | A | 3/1995 | Schoenberger et al. | |
| 5,435,817 | A * | 7/1995 | Davis et al. | 55/337 |
| 5,529,593 | A * | 6/1996 | Simmons | 55/354 |
| 5,616,172 | A | 4/1997 | Tuckerman et al. | |
| 5,641,343 | A | 6/1997 | Frey | |
| 5,753,000 | A | 5/1998 | Chiu et al. | |
| 5,753,563 | A | 5/1998 | Guan et al. | |
| 5,803,940 | A | 9/1998 | Rick et al. | |
| 5,837,020 | A | 11/1998 | Cartellone | |
| 5,840,092 | A | 11/1998 | Rick et al. | |
| 5,904,755 | A * | 5/1999 | Kanazashi et al. | 96/55 |
| 5,925,172 | A | 7/1999 | Rick et al. | |
| 5,925,320 | A | 7/1999 | Jones | |
| 5,997,619 | A | 12/1999 | Knuth et al. | |
| 6,017,375 | A | 1/2000 | Duell et al. | |
| 6,036,757 | A | 3/2000 | Gatchell et al. | |
| 6,053,968 | A | 4/2000 | Miller | |
| 6,126,729 | A | 10/2000 | Smith | |
| 6,156,085 | A | 12/2000 | Chiu et al. | |
| 6,217,627 | B1 | 4/2001 | Vyskocil et al. | |
| 6,315,821 | B1 | 11/2001 | Pillion et al. | |
| 6,328,791 | B1 | 12/2001 | Pillion et al. | |
| 6,344,065 | B1 | 2/2002 | Boulva | |
| 6,361,590 | B1 | 3/2002 | Gilbert, Jr. et al. | |
| 6,413,302 | B1 | 7/2002 | Harrison et al. | |
| 6,447,587 | B1 | 9/2002 | Pillion et al. | |
| 6,508,868 | B2 | 1/2003 | Pillion et al. | |
| 6,511,531 | B1 | 1/2003 | Cartellone | |
| 6,551,185 | B1 | 4/2003 | Miyake et al. | |
| 6,585,792 | B2 | 7/2003 | Schneider et al. | |
| 6,616,722 | B1 | 9/2003 | Cartellone | |
| 6,616,736 | B2 | 9/2003 | Massey et al. | |
| 6,623,538 | B2 * | 9/2003 | Thakur et al. | 55/385.2 |
| 6,645,266 | B2 | 11/2003 | Huang | |
| 6,660,070 | B2 | 12/2003 | Chung et al. | |
| 6,695,891 | B2 * | 2/2004 | Reid | 55/495 |
| 6,702,879 | B2 | 3/2004 | Yokoyama et al. | |
| 6,712,889 | B2 | 3/2004 | Pillion et al. | |
| 6,749,654 | B2 | 6/2004 | Hilliard | |
| D495,043 | S | 8/2004 | Gatchell et al. | |
| 6,793,703 | B1 * | 9/2004 | Sledge et al. | 55/495 |
| 6,800,106 | B2 * | 10/2004 | Cogar et al. | 55/385.6 |
| D497,985 | S | 11/2004 | Christianson | |
| 6,821,310 | B2 | 11/2004 | Hedstrom | |
| 6,863,704 | B2 | 3/2005 | Pillion et al. | |
| D509,292 | S | 9/2005 | Gatchell et al. | |
| D512,495 | S | 12/2005 | Russak et al. | |
| D513,313 | S | 12/2005 | Russak et al. | |
| D513,431 | S | 1/2006 | Russak et al. | |
| 6,989,051 | B2 | 1/2006 | Parisi et al. | |
| D515,189 | S | 2/2006 | Russak et al. | |
| 7,025,798 | B2 | 4/2006 | Endo | |
| D525,691 | S | 7/2006 | Russak et al. | |
| D525,692 | S | 7/2006 | Russak et al. | |
| 7,074,261 | B2 | 7/2006 | Murphy | |
| D527,086 | S | 8/2006 | Russak et al. | |
| 7,112,232 | B2 | 9/2006 | Chang et al. | |
| 2002/0040642 | A1 * | 4/2002 | Pillion et al. | 96/424 |
| 2002/0152894 | A1 | 10/2002 | Pillion et al. | |
| 2003/0056478 | A1 * | 3/2003 | Pillion et al. | 55/320 |
| 2004/0110850 | A1 | 6/2004 | Jordan et al. | |
| 2005/0055990 | A1 | 3/2005 | Choi et al. | |
| 2005/0160914 | A1 | 7/2005 | Hsieh | |
| 2005/0183576 | A1 | 8/2005 | Taylor et al. | |
| 2005/0195600 | A1 | 9/2005 | Porchia et al. | |
| 2006/0016335 | A1 | 1/2006 | Cox et al. | |
| 2006/0032199 | A1 | 2/2006 | Beam et al. | |
| 2006/0053758 | A1 | 3/2006 | Wu et al. | |
| 2006/0130657 | A1 | 6/2006 | Bohlen et al. | |
| 2006/0158138 | A1 | 7/2006 | Walter et al. | |
| 2006/0176693 | A1 | 8/2006 | Walter et al. | |
| 2007/0084162 | A1 | 4/2007 | Seipler et al. | |

FOREIGN PATENT DOCUMENTS

| | | |
|---|---|---|
| JP | 09122419 A | 5/1997 |
| WO | WO 2007/084953 | 7/2007 |

* cited by examiner

FIG. 1B
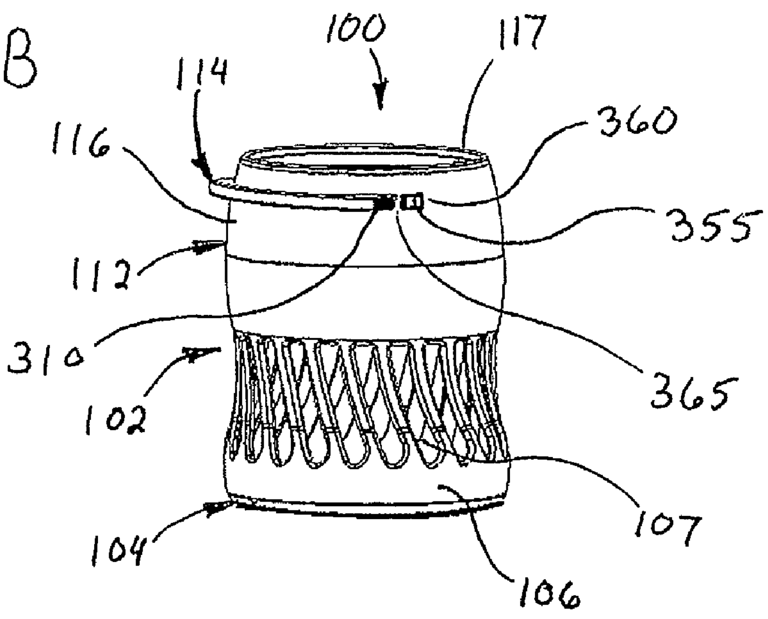
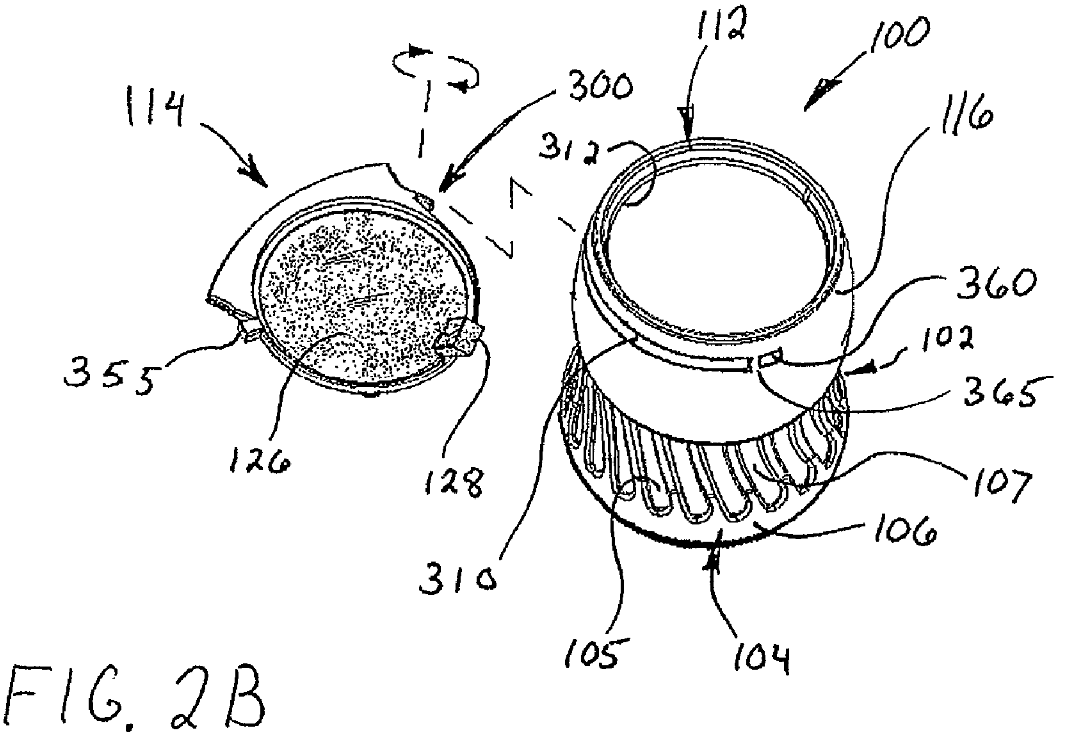
FIG. 2B

PORTABLE DEVICES FOR MITIGATING ACCUMULATION AND LOCALIZED SETTLING OF AIRBORNE PARTICULATES

CROSS-REFERENCE TO RELATED APPLICATIONS

This application claims priority from U.S. Provisional Patent Application Ser. No. 60/809,254, filed on May 30, 2006, the entity of which is expressly incorporated by reference herein in its entirety.

BACKGROUND OF THE INVENTION

1. Field of the Invention

The present invention relates to devices for establishing airflow patterns in localized areas, and, more specifically, to devices for mitigating the accumulation and localized settling of airborne particulates in localized areas.

2. Discussion of the Related Art

In many household environments, a number of airborne particulates, e.g., allergens, dust, and/or other airborne matter, are present which can create respiratory problems for individuals living within the home. Some such airborne particulates can accumulate on various readily viewable surfaces within the home, which can be aesthetically displeasing.

To manage, control, or otherwise influence the airborne travel or accumulation of airborne particles, numerous known devices and procedures are utilized. As a first example, a number of different air cleaning and purification devices have been developed which draw the air from the interior environments of the home through the device in order to filter and remove allergens, dust, or other airborne particulates, from the airflow passing through the device.

However, with regard to the vast majority of devices of this type, the devices have a complex construction that requires significant time and expense to assemble. In addition, the size and air handling capabilities of many prior art purification devices are suited for removing dust and allergens from an interior space much larger than a single area of a room, or a personal workspace such as in a cubicle, or around a desk or table at which an individual is seated.

Therefore, it is desirable to develop a relatively small, preferably portable, device which mitigates or sufficiently slows the rate of localized settling and accumulation of airborne particulates.

SUMMARY OF THE INVENTION

According to the invention, portable devices for mitigating the accumulation and localized settling of airborne particulates are provided. The devices establish airflow patterns which push or carry various airborne particulates outwardly away therefrom, thereby establishing a localized zone having relatively fewer airborne particulates. Correspondingly, the device establishes a localized zone, defined circumferentially about the perimeter of the device, in which there is relatively less surface accumulation of particulates which were previously airborne and settled out. The devices establish such airflow patterns by proving a fan which draws a volume of air axially through a top portion of the device, then pushes the volume of air axially down though the device where it is radially emitted from the bottom portion of the device, defining a circumferentially expanding plane of airflow.

According to a first aspect of the invention, a device is provided for mitigating accumulation and localized settling of airborne particulates. The device includes a housing having an upper portion and a lower portion, at least one of which has a filter element removably mounted thereto. The housing upper portion defines an air intake, whilst the housing lower portion defines an air outlet. The air outlet defines an outer periphery having at least one sidewall. A fan assembly is mounted in the housing and has a generally upright axis of rotation. The fan, within the fan assembly, axially draws a volume of air downwardly through the housing upper portion and discharges the volume of air into the housing lower portion where it is emitted through substantially the entire periphery of the housing lower portion.

In some implementations, the filter assembly is removably seated in the recessed upper wall or tray of the housing upper portion. This allows the filter to remain visually conspicuous during use, whereby a user can easily identify when the filter needs replacing.

In yet other implementations, the housing defines an upright, generally cylindrical body. It has a circumferential sidewall, of variable diameter along its length. Preferably, it has a reduced diameter portion located medially, between upper and lower ends thereof. Multiple elongate slots extend generally helically through the circumferential sidewall. These elongate slots effectuate and emitted airflow which has a pattern that flows both generally downwardly toward an underlying support surface, and radially outwardly from substantially the entire perimeter of the circumferential sidewall.

These and other aspects and of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1B is a perspective view of a variant of the device of FIG. 1A;

FIG. 2B is a perspective view of the device of FIG. 1B, with the filter tray pivoted to an open position;

Figure 1A:
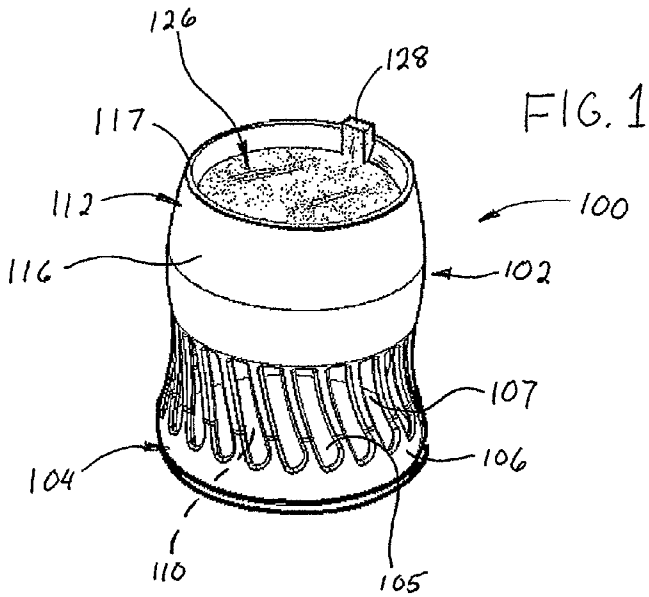
FIG. 1A is a perspective view of a first embodiment of the device of the present invention.

In describing the preferred embodiment of the invention that is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words connected, attached, or terms similar thereto are often used. They are not limited to direct connection but include connection through other elements where such connection is recognized as being equivalent by those skilled in the art.

DETAILED DESCRIPTION OF THE INVENTION

The present invention and the various features and advantageous details thereof are explained more fully with reference to the non-limiting embodiments described in detail in the following description.

Figure 6:
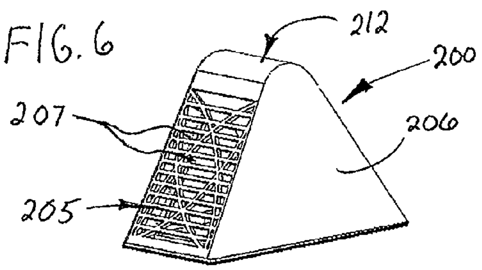
FIG. 6 is a perspective view of a second embodiment of the present invention.
Figure 7:
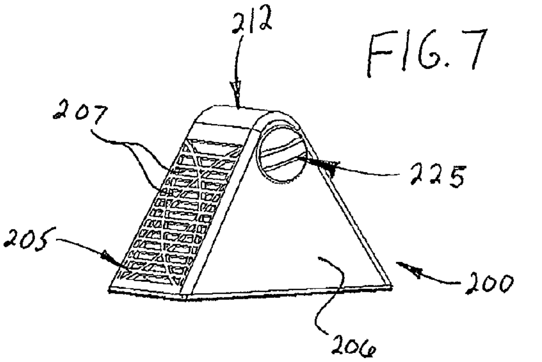
FIG. 7 is a partially broken away isometric view of the device of FIG. 6.
Figure 8:
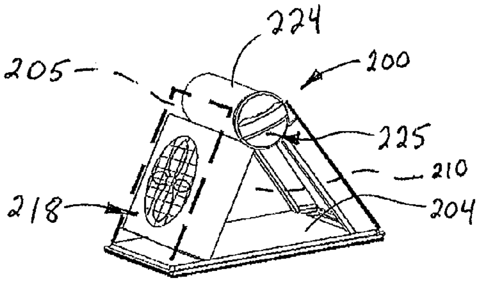
FIG. 8 is an isometric view of the device of FIG. 6.

Portable devices for mitigating the accumulation and localized settling of airborne particulates, constructed according to the present invention, are indicated generally as, e.g., devices 100 in FIGS. 1A and 1B, and as devices 200 in FIGS. 6 and 8.

The devices 100, 200 of the present invention, establish airflow patterns which carry various airborne particulates out of the generally localized effected zone of operation. Devices 100, 200 are adapted and configured to push, propel, waft, blow, urge, or otherwise influence, e.g., the airborne traverse of airborne particulates or other airborne bodies, in a generally localized area. Accordingly, by suitably positioning and operating the devices 100, 200 of the invention, a user can enjoy the immediately surrounding vicinity having relatively fewer or a lower concentration of airborne particulates. Correspondingly, effected areas of the devices 100, 200 exhibit relatively less accumulation and localized settling of such airborne particulates upon, for example, upper surfaces of furniture or surfaces of various household accessories.

Referring now to FIGS. 1A, 1B, 1C, and 1D, each of devices 100 includes a housing 102, a fan assembly 118 mounted to the housing 102, a filter element 126, and, optionally, a shroud 228. Housing 102 is a generally upright, optionally cylindrical, structure which includes a lower portion 104, upper portion 112, and fan mounting structures 120.

The lower portion 104 has a generally circular bottom wall 105, although as desired, the bottom wall defines other, e.g., polygonal or other perimeter shapes, as desired. The lower surface of the bottom wall 105 interfaces with the underlying supporting surface 90 (FIG. 11) or structure. Suitable support surfaces 90 include, but are not limited to, countertops, desktops, tabletops, and/or others.

At least one sidewall 106 extends upwardly from the outer perimeter of the bottom wall 105. Accordingly, the implementations of lower portion 104 with circular bottom walls 105 have a single circumferential sidewall 106 extending upwardly from the bottom wall 105 perimeter.

The height or vertically oriented length dimension of the circumferential sidewall 106 generally defines the length dimension of the lower portion 104. In some embodiments, such as those illustrated in FIGS. 1A, 1B, and 1C, the width dimension or diameter of the circumferential sidewall 106 varies along a traverse of the length thereof. In other words, the circumferential sidewall 106 and thus the housing lower portion 104 have a reduced diameter, medial portion. Correspondingly, when viewed from, e.g., a front or side elevation, the circumferential sidewall 106 arcuately tapers inwardly from the bottom wall 105, then arcuately opens toward the upper edge of the housing lower portion 104.

The upper surface of the bottom wall 105 and the inwardly facing surface of the circumferential sidewall 106 define outermost boundaries of a void 110 with the housing lower portion 104. Void 110 serves as a chamber for distributing the volume or flow of air out of the device 100. In particular, the air which passes through the device 100, enters the open upper end of lower portion 104, travels axially down into the void, then is emitted or otherwise exits housing lower portion 104 through a plurality of apertures 107 which extend through the circumferential sidewall 106. In some implementations, the apertures 107 are, e.g., elongate slits which extend generally between the bottom wall 105 and the upper opening of the housing lower portion. However, the apertures 107, as desired, can be round throughbores or other apertures, adapted and configured for particular end use environment.

In some preferred implementations, the elongate apertures 107 are arcuate or curvilinear, such as helical or otherwise. As desired, the magnitudes of the width dimensions of apertures 107 can be greater than the magnitudes of the width dimensions of the sidewall 106 material between adjacent apertures 107, whereby some of the sidewall 106 can have more void space than sidewall 106 material. However, the particular opening width dimensions of the elongate apertures 107, the opening length dimension of the elongate apertures 107, the opening radii, or other configuration(s) are selected to produce the desired fluid dynamic characteristics to the airflow as it exits the housing lower portion 104, explained in greater detail elsewhere herein.

Accordingly, regardless of the particular configuration of the apertures 107, it is apparent that by emitting air therethrough, the housing upper portion 114 can generally define an air output of the device 100.

Housing upper portion 112 sits upon housing lower portion 104 and is generally coaxially aligned therewith. The housing upper portion 112 has an upper wall or filter tray 114 (FIG. 2A), and at least one sidewall 116, and an open lower wall or lower end which is in fluid communication with the open upper end of housing lower portion. Accordingly, the housing upper and lower portions 112, 104 cooperate to suitably direct a flow of air therethrough.

Filter tray 114 is adapted and configured to removably hold or support a filter element 126 thereupon. Referring to FIGS. 1A-1C and 2A-2C, filter tray 114 is preferably recessed into the top end of housing upper portion 112. In these embodiments, an upwardly projecting lip 117 extends up from the recessed filter tray 114 and defines the uppermost portion of the device 100. The tray 114 is generally circular in perimeter shape, optionally, other shapes, as desired.

Figure 2A:
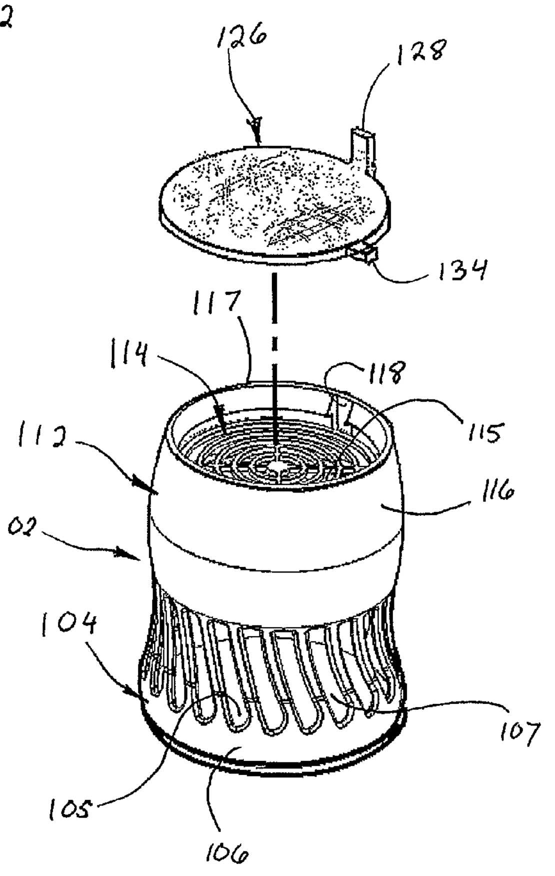
FIG. 2A is a perspective, partially exploded, view of the device of FIG. 1A.

Filter tray 114 is adapted and configured to permit air to flow therethrough. Referring now to FIGS. 2A and 2C, the tray 114 can have multiple concentrically arranged annular openings 115, so that the tray 114 has a grill-type configuration, enabling airflow passage therethrough. In other implantations, such as those of FIGS. 1C and 1D, the tray is an annular shelf or ledge radiating in from the inner circumferential surface of the sidewall 116, again permitting airflow therethrough. Accordingly, it is apparent that by intaking air through, e.g. filter tray 114, the housing upper portion 112 can generally define an air intake of the device 100.

In typical implementations, the filter tray 114 generally defines the upper wall of the device 100. Optionally, referring to FIGS. 1D and 2D, the upper wall of the device 100 is defined by a removable lid or cover 121. Cover 121 preferably snap-fits to the upper end of the device 100 and overlies, e.g., the filter element 126 and the filter tray 114.

Filter tray 114 can be movable with respect to the remainder of the device 100. As one example, referring now to FIGS. 1B and 2B, the filter tray 114 can be pivotably attached to the housing upper portion 112, by way of a suitable pivot mechanism 300. Preferably in these implementations, the filter tray 114 pivotably actuates through a slot 310 extending through the sidewall 116. When the filter tray 114 is pivoted through the slot 310 and into the housing upper portion 112, i.e., in the usable configuration, the outer circumferential surface of the filter tray 114 interfaces and is nested within a channel 312 that extends into the projecting lip 117 or sidewall 312, about the inner circumferential surface thereof.

The channel 312 provides a mechanical interference to non-desired withdrawal of the pivoting filter tray 114, axially, from the device 100. Optionally, the device 100 can be devoid of the pivot mechanism 300 and the filter element 126 can be slidingly inserted in, e.g., a housing frame (not illustrated) or alone, through the slot 310 and into the channel 312.

Referring now to FIGS. 1B and 2B, the pivoting filter tray 114 and the housing upper portion 112 are adapted and configured to selectively lock the upper wall in place, and together define a lock mechanism 350. As one example of a suitable lock mechanism 350, the filter tray 114 can include a tab 355 which flexibly or resiliently extends from its outer perimeter. As a corresponding structure to the tab 355, housing upper portion 112 has an opening 360, adjacent the end of slot 310 which is distal the pivot mechanism 300. The opening 360 and slot 310 define a post 365 therebetween.

Opening 360 is sized and configured to receive the tab 355 therethrough, from its inwardly facing side. When the filter tray 114 is pivoted into the housing upper portion 112, tab 355 snaps or flexes behind the opening 360. In the locked configuration, the tab extends from the interior of the device 100 through the opening 360. Thus, the web of material connecting the tab 355 to the filter tray 114 interfaces the inwardly facing surface of post 365, thus preventing the non-desired pivotal withdrawal of the tray 114 from the housing upper portion 112.

Figure 3:
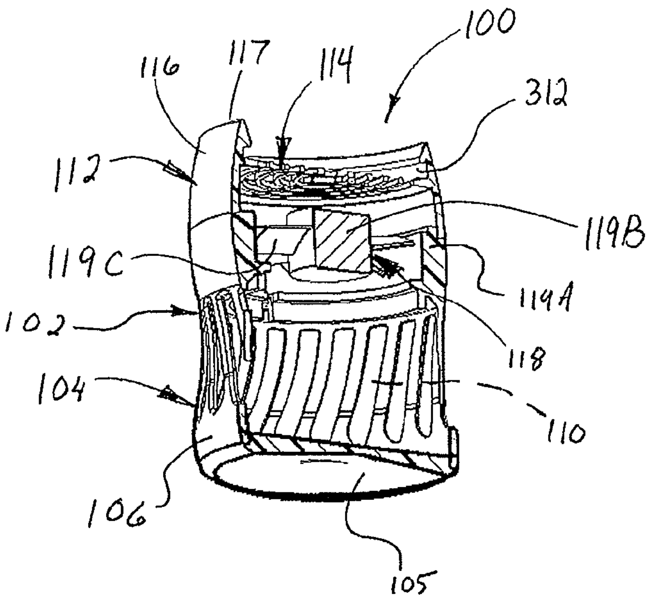
FIG. 3 is a cross-sectional view of the device of FIG. 1A
Figure 4:
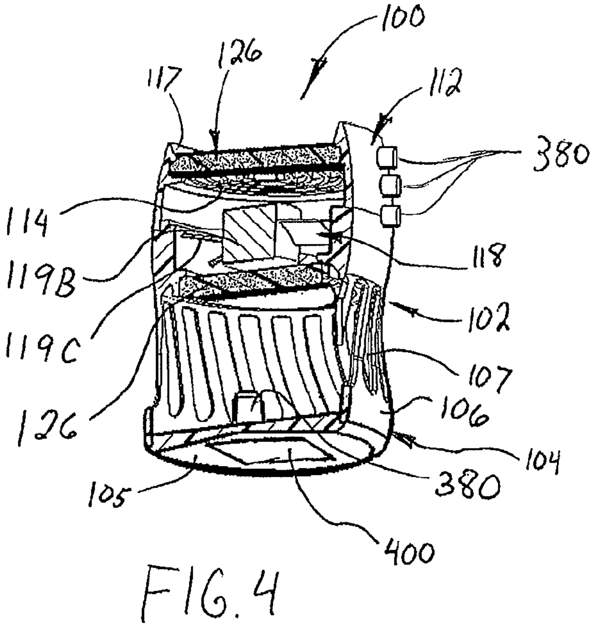
FIG. 4 is a cross-sectional view of another variant of the device of FIG. 1A
Figure 5:
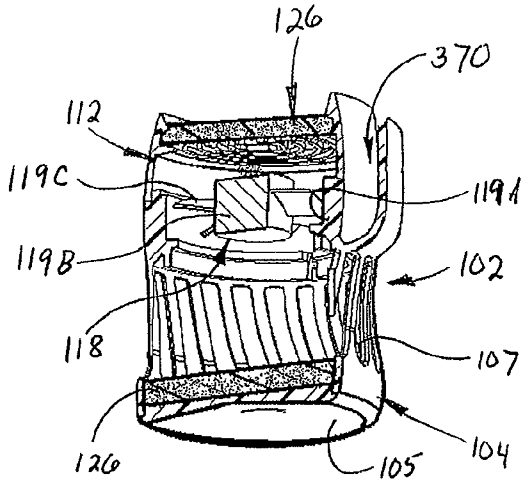
FIG. 5 is a cross-sectional view of another variant of the device of FIG. 1A

Referring now to FIGS. 3-5, a fan mounting structure 120 is attached to the inner surface of the upper portion circumferential sidewall 116, preferably adjacent the intersection of the housing upper and lower portions 112, 104. The fan mounting structure 120 includes a variety of suitable configurations, depending on the particular fan assembly 118 which is implemented in the device 100. Fan mounting structure 120, as seen in FIG. 3, preferably includes a shoulder which extends radially inward from the sidewall 116 inner circumferential surface. Accordingly, fan mounting structure 120 is, e.g., an annular shelf or ledge which bears the mass of fan assembly 118 at its perimeter.

In some implementations, housing 102 further includes, e.g., various storage compartments, such as receptacle 370, seen in FIG. 5. The receptacles 370 can be mounted or located in a variety of suitable locations on the device 100, but are preferably on various outwardly facing surfaces of the housing upper and lower portions 112, 104. Receptacle 370 can be configured as, e.g., a pocket or other receptacle for storing, e.g., a manual duster, for holding a volume of a fragrant substance, for holding a volume of an insecticide, or for holding other articles and/or substances, depending on the particular end-use configuration.

Furthermore, referring now to FIG. 4, the housing 102 can be adapted and configured to also provide illumination, either for functional illumination or for primarily aesthetic lighting effects, as desired. The housing 102 can accordingly include at least one illumination source 380, which can be incandescent light bulbs, fluorescent light bulbs, light emitting diodes (LEDs), or others as desired. The illumination source 380 can be mounted to or through, for example, ones of the upper and lower portion sidewalls 106 and 116. Optionally, the illumination sources 380 can be mounted in the interior space of the device 100. Thus, for embodiments which mimic the appearance of a conventional candle, the illumination source 380 includes one or more candle simulating LEDs operably mounted within the housing 102.

Regardless of exact positioning of the illumination sources 380, depending on the desired end-use lighting effect, portions of the housing 102 can be made from transparent or translucent materials, permitting at least some light transmission therethrough.

As one example, housing 102 can be made of substantially clear, un-occluded glass or polyurethane. In addition, different portions and/or surfaces of the housing 102 may have different optical characteristics.

For example, either the inwardly or outwardly facing surfaces of the sidewalls 106, 116 can have a sandblasted finish applied thereto, using a conventional sandblasting technique, and/or other conventional types of processes and/or coatings to achieve the desired light-diffusing finish. As another example, the inwardly or outwardly facing surfaces of sidewalls 106, 116 may be imparted by one or more of etching, frosting, knurling, otherwise roughening, applying a light-diffusing coating (such as a conventional silica coating used in light bulbs), or the like.

The circuitry components are illustrated schematically as circuitry 400, in FIG. 4. Circuitry 400 includes any of a variety of well-known suitable components and accessories. For example, circuitry 400 includes a microcontroller, preferably an Atmel Mega8 processor, manufactured by Amtel Corporation, located in San Jose, Calif., and may have onboard program memory of its own and/or external program memory containing the other stored logic with instructions for interpreting the light show data stored in the memory.

Furthermore, the circuitry 400 preferably includes a printed circuit board (PCB) having one or more memory module(s) to store, e.g., a plurality of preprogrammed light shows for display by the illumination sources 380. Preferably, the memory 122 is a MAXIM.™. DS2506-UNW by Dallas Semiconductor (http://www.maxim-ic.com/) or a Microchip 24LC00, manufactured by Microchip Technologies, of Chandler, Ariz., or an Atmel AT25F512 memory, manufactured by Amtel Corporation, of San Jose, Calif. In some embodiments, the various memory module(s) may be a memory chip or card detachable from the microcontroller and device 100, so that the light shows stored therein may be removed and replaced with other memory cards/chips. In this manner, the user can purchase new memories over time to continually update the light object with new and different light shows. It will be apparent to those of ordinary skill in the art that various other memories, controllers, and/or components can be used depending on various design considerations, such as the amount of memory required, processing speed, size, reprogramability, and the like.

Examples of light shows that can be stored in the memory 122 and the data corresponding thereto, are described in more detail in the related provisional application entitled "Method and Apparatus for Storing and Defining Light Shows", Ser. No. 60/641,441, filed on Jan. 6, 2005, the contents of which are incorporated herein by reference.

The power can be supplied to the illumination source 380 by either a DC or AC power source, or both, as desired. As for DC power sources, one or more batteries or a battery pack mounted in the housing lower portion 104, or elsewhere in the device 100, as desired. Preferably, the batteries or battery pack are rechargeable. Such recharging may be accomplished external of the device 100, or while the batteries are still installed in the device 100 by the provision of a conventional in-unit charging apparatus (not shown). Preferably, power is instead supplied from, e.g., 120V AC or other AC supply, through a wall socket with the provision of a power cord and a conventional power converter, transformer, and the like. Regardless, the power supply used to energize the illumination source preferably also is used to energize the fan assembly 118.

Referring now to FIG. 3, fan assembly 118 includes a frame 119A, a motor 119B with an output shaft, and multiple fan blades 119C. The frame 119A cooperates with the fan mounting structure 120 and provides the mounting interface between the fan assembly 118 and the housing 102. The frame 119A has multiple sidewalls which rest upon and are secured to the fan mounting structure 120. The motor 119B is electrically connected to the power supply, preferably by way of circuitry 400. The fan blades 119C, which extend radially from the motor output shaft, are adapted and configured to provide the desired flow characteristics through device 100. Accordingly, blades 119C have pitches, profiles, surface areas, and/or other characteristics which effectuate the desired flow characteristics through the device 100, at least in combination with other components of the fan assembly 118, such as, e.g. apertures 107.

The fan motor 119B and blades 119C are adapted and configured to rotate the output shaft and blades 119C at a rotational speed of at least about 2,500 rpm, optionally at least about 2,700 rpm or 3,000 rpm, or otherwise. Also, the fan assembly 118 defines a flow rate of at least about 15 cubic feet per minute (cfm), optionally 17 cfm, preferably about 25 cfm, optionally others, through the device 100, 200. It should be noted that device 100 is configured such that the realized particular output flow rate corresponds to the intended end use environment, whereby the output or exhausting flow rate is preferably within the range of 3 cfm to 90 cfm, as per the particular implementation. For example, when device 100, 200 is used within a personal workspace, e.g., a small cubicle, the output or exhausting flow rate can be about 3-10 cfm; whilst devices 100, 200 are used within a relatively large volume area, e.g., a large conference room, the output or exhausting flow rate can be about 70-90 cfm.

In preferred embodiments, the motor 119B is relatively quiet during use, whereby the fan assembly 118 produces an operational sound level of less than about 65 dB, optionally less than about 60 dB, when evaluated at a distance of 12 inches from the fan assembly. Such "db levels" were observed and evaluated within a setting having an ambient noise level of, e.g., 54 dB.

Preferably the fan assembly 118 is mounted generally axially between the housing upper and lower portions and between their respective. Correspondingly, the fan assembly 118 axially draws air downwardly into the device, passing first through filter element 126 at the top of device 100.

Filter element 126 can be formed of any suitable material (s) capable of removing airborne particulates, such as dust, pollen, pet dander, dust mite dander, other allergens, and/or other particulates, from the airflow passing therethrough. Accordingly, filter element 126 includes any of, e.g., nonwoven filter elements, electrostatic filter elements, and HEPA filter elements.

However, in various preferred embodiments, filter element 126 is a fibrous filter, whereby it is, e.g., a matted mass of fibers. The particular characteristics of the filter element 126 are selected to coincide with the intended end use characteristics of device 100, 200. Accordingly, the fiber diameters and/or other dimensions and fiber characteristics, as well as, e.g., how tightly the fibers are compressed or packed together in the resultant filter element 126, is such that the matted mass of fibers suitably retains airborne particulates, such as dust, pollen, pet dander, dust mite dander, other allergens, and/or other particulates, whilst the airflow passes therethrough.

Notwithstanding, the fibrous implementations of filter element 126 have enough void space in the interstices between the adjacent fibers, and thus porosity, to allow the desired rate of airflow therethrough. Accordingly, in embodiments of device 100, 200 with relatively larger, more powerful motors 119B, the filter elements 126 can be relatively less porous and thus more flow restrictive, whilst still outputting the desired volume of air at the desired flow rate from the device. Correspondingly, in embodiments of device 100, 200 with relatively smaller, less powerful motors 119B, the filter elements 126 can be relatively more porous and thus less flow restrictive, to effectuate the desired volume of air, at the desired flow rate, outputted from the device.

For example, in various fibrous implementations of filter element 126, the matted mass of fibers can define porosity values of about 70%-99%, optionally about 50%-99%, optionally less than about 50% based again on the particular, e.g., performance characteristics of motor 119B and the desire performance characteristics of the overall device 100, 200.

As for suitable materials for use as fibers in filter element 126, any of a variety of natural or synthetic materials can be used. Exemplary of natural fibers include cellulose, and/or others. However, preferred embodiments of filter element 126 are made from synthetic, even more preferably polymeric, materials.

As one example, in some fibrous implementations of filter elements 126, the fibers can be made from 100% polyethylene. It is noted that the fibers can be made from any of numerous ones of the polyethylenes, including, but not limited to, high-density polyethylene, medium-density polyethylene, low-density polyethylene, and their respective copolymers. Notwithstanding, various other polyolefins, besides the polyethylenes, can be used to make filter element 126. Optionally, yet other polymeric compounds are contemplated for use in making filter element 126. Exemplary are such polymers as polyvinyl chloride and chlorinated polyvinyl chloride copolymers, various of the polyamides, polycarbonates, and others. For any polymeric material employed in structures of the invention, any conventional additive package can be included such as, for example and without limitation, slip agents, anti-block agents, release agents, anti-oxidants, fillers, and plasticizers, to control, e.g., processing of the polymeric material.

In some implementations, the filter elements 126 are treated or impregnated with a sticky or tacky substance or additive to improve particle retention. The tacky additive further helps retain the particles thereupon during maintenance of the device, whereby the majority of the particles stuck to filter element 126 remain thereupon while changing, transporting, disposing of, or otherwise manipulating filter element 126. They can be treated by spray, submersion, or other conventional application methods of tacky additives, to an upper surface, a lower surface, both, or the entire filter element 126, as desired.

Some preferred implementations of filter elements 126 include an oil-type substance as the tacky additive, or as a component thereof. Non-limiting, exemplary suitable oil-type substances include, e.g. various organic oils such as mineral oils, vegetable oils, petroleum-derived oils and/or others; inorganic or synthetic oils, waxes, or other compositions and substances which are suited to render the filter elements 126 tacky or leave a tacky surfacing coating thereupon.

However, the sticky or tacky additive can also be made as a multi-component substance, e.g., a tack component or tackifier and a resin component. Regarding the tack component, suitable tack components or tackifiers are, e.g., any of the above-listed oil-type substances, as well as elastomeric terpolymers, either fully saturated or otherwise, and having about 50% solids. Regarding the resin component, any of a variety of suitable emulsions, preferably ethylene-vinyl chloride emulsions, are contemplated, again preferably having about 50% solids.

Filter 126 can further be treated with various other additives and/or substances, in addition to, or in lieu of the tacky additive, which are selected based on the intended end use of the device 100, 200. Such other additives and/or substances include e.g., an insect repellants, antibacterial substances, antigenicity-reducing agents, and/or other substance depending on the intended end use. According, as one example, when device 100 is used for, e.g., reducing the amount of allergens or antigens near a user, the filter element 126 can be further treated with an antigenicity-reducing substance, agent, or component.

The antigenicity-reducing agent can be any of a variety of well known such agents. Suitable antigenicity-reducing agents include, e.g., olive extracts, privet extracts, and extracts from pomegranate, neem, persimmon, tea, bamboo, perilla, peppermint, Japanese Hinoki cypress (*Chamaecyparis obtusa*), Hiba arborvitae (*Thujopsis dolabrata*), eucalyptus, tea tree, and the like. Examples of extracted compounds include: tannic acid, gallic acid, and the like. Other examples include: high molecular weight compounds in which a side chain of a linear high molecular weight repeating unit includes a phenol group that is monovalent or higher such as poly(para-vinyl phenol); high molecular weight compounds in which a side chain of linear high molecular weight repeating units includes a phenol group that is monovalent such as dioxybenzoic acid polymer; a polyoxyethylene chain such as disodium lauryl diphenyl ether disulfonic acid and/or a benzene sulfonate that is bivalent or higher and includes an ethylene chain in its molecule and/or a hydroxybenzoic acid such as a sulfate that is bivalent or higher and includes an ethylene chain in its molecule, a hydroxy benzoate such as 2,5-dihydroxy benzoate, or the like; an aromatic hydroxy compound; a carbonate of an alkali metal; alum; lauryl benzene sulfonic acid; lauryl sulfate; polyoxyethylene lauryl ether sulfate; phosphate; zinc sulfate and/or lead acetate; and the like. As require for application or end use purposes, the antigenicity-reducing agent can be implemented in combination with various other components, such as lubricants, surfactants, and/or others.

In any of the contemplated implementations, as desired, the filter elements 126 can further include written indicia or other, e.g., printed patterns, preferably on surfaces of the filter elements 126 which remain visible during use.

The perimeter shape of filter element 126 closely corresponds to the perimeter shape of the housing upper portion 112 upper wall 116. Accordingly, as seen in FIGS. 1A-2D, the filter element 126 defines a generally circular, annular, or ring-shaped perimeter configuration.

Filter element 126 can be flat, with opposing upper and lower surfaces. The thickness dimension, between the element 126 upper and lower surface, is preferably fairly small, whereby the filter element 126 is fairly thin, e.g. less than about 1 inch, less than about 0.8 inch, less than about 0.5 inch, less than about 0.05 inch, less than about 0.003 inch, or others as desired.

Yet other configurations of filter element 126 are implemented, based on the particular end use of device 100. When more filtering performance is required, additional filtering surface area can provided to filter element 126, while still retaining a generally compact size, by utilizing a pleated, folded, corrugated, or otherwise employing an irregular surface, configuration.

The filter element 126 is preferably a replaceable component of the device 100. It is adapted and configured to be suitably retained or held against the filter tray 114, yet remain relatively easily accessible to ease replacement thereof. Thus, when the filter element 126 has become clogged with, e.g., dust or other allergens or airborne particulates, the element 126 is simply removed and replaced by a new one.

Figure 1C:
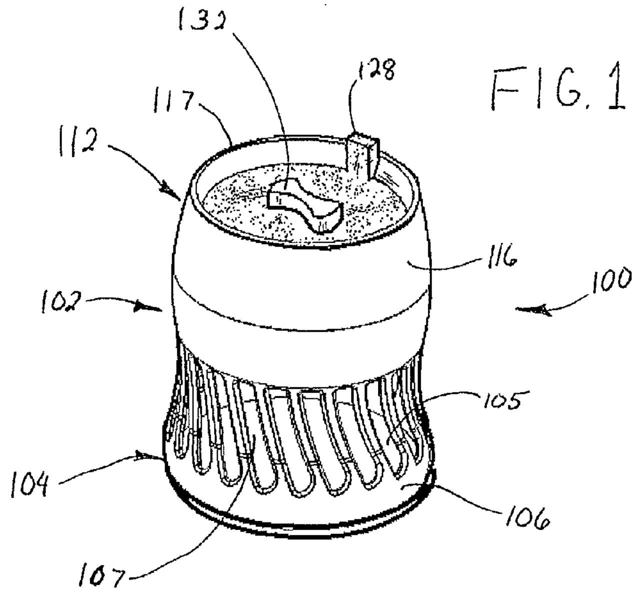
FIG. 1C is a perspective view of another variant of the device of FIG. 1A.
Figure 2C:
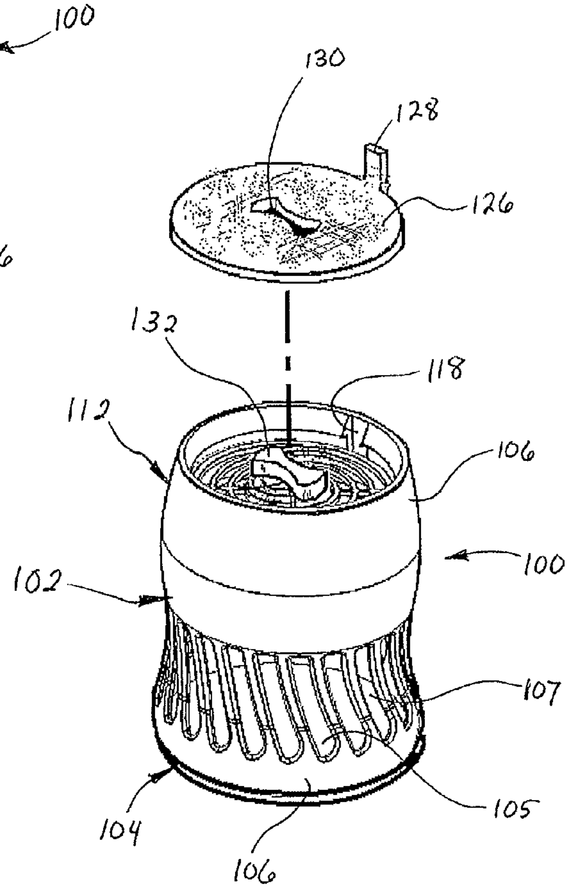
FIG. 2C is a perspective, partially exploded, view of the device of FIG. 1C.
Figure 1D:
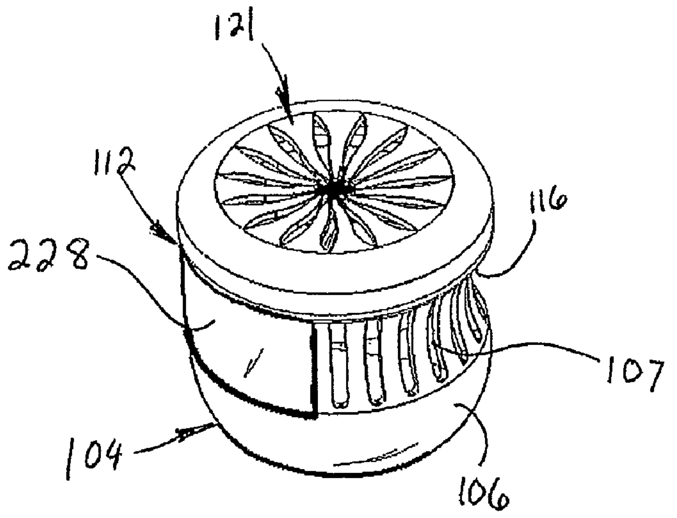
FIG. 1D is a perspective view of another variant of the device of FIG. 1A.
Figure 2D:
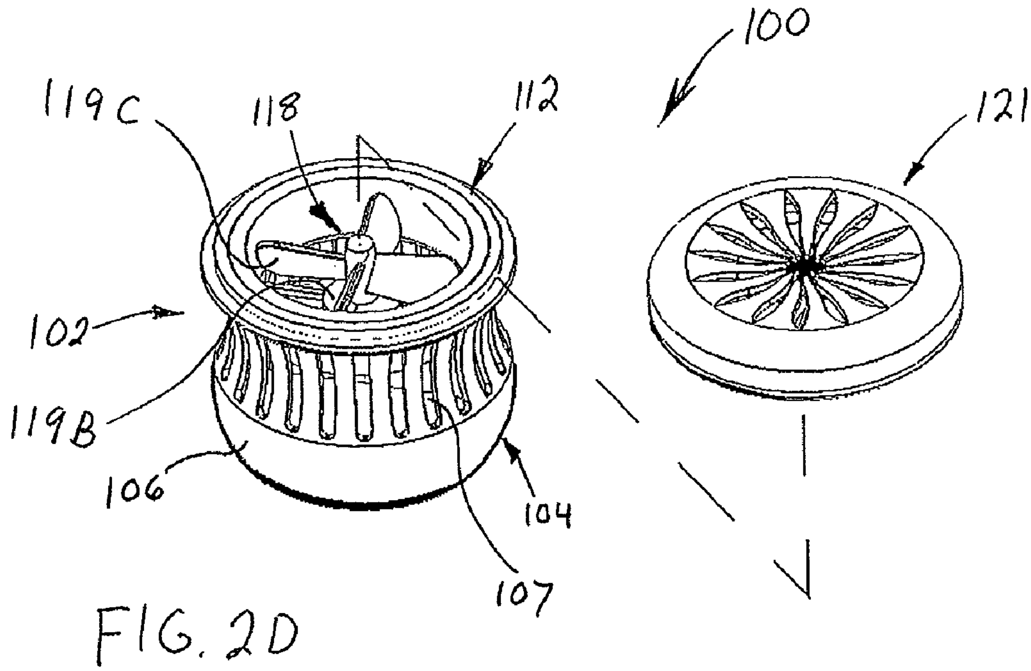
FIG. 2D is a partially exploded view of the device of FIG. 2C.

Referring now to FIGS. 1C and 2C, to suitably hold or retain alignment of the filter element 126 in place during use, the filter element 126 can include, e.g., a tab 128 and/or an aperture 130. Tab 128 extends outwardly from the outer perimeter of the filter element 126, and upwardly from its upper surface. To hold the tab 128, a depression 118 is formed into the inner circumferential surface of the projecting lip 117. Thus, the side surfaces of the depression 118 interface with the corresponding outer edges of tab 128 retaining it in place.

Still referring to FIGS. 1C and 2C, apertures 130 extend through the entire thickness dimension of some filter elements 126. The aperture 130 has a perimeter shape which corresponds to the perimeter shape of a projection 132 that extends upwardly from the upper surface of tray 114. Accordingly, in use, the projection 132 extends through and frictionally interfaces the aperture 130, holing the filter element 126 to the housing upper portion 112.

Referring now to FIGS. 4 and 5, the device 100 can include more than one filter element 126, as desired. Accordingly, a secondary filter element 126 can be housed below or downstream of the fan assembly 118, in addition to the filter element 126 in the filter tray 114, adjacent the top of the device 100. Although described as "secondary," it is fully appreciated that such filter can be use alone.

In some implementations, seen in FIG. 4, the secondary filter element 126 can be removably attached to the bottom of the fan mounting structure 120. Optionally, the secondary filter can sit directly upon the upper surface of bottom wall 105, seen in FIG. 5. In such embodiments, the secondary filter element 126, sitting on the bottom wall 105, is preferably treated with a tacky substance and the filter will primarily serve as, e.g., an adhesive trap to hold relatively large particles which, absent the secondary filter 126, would have collided with and deflected off the bottom wall.

Furthermore, the secondary filter elements 126 of FIGS. 4 and 5 can include a circumferential sidewall, made from the filtering material. Accordingly, the secondary filter 126 can be configured as a filtering sock-like, cup-like, or cylindrical, member, which is housed within the housing lower portion 104, so as to cover the apertures 107 with filtering material.

In some implementations, the secondary filter 126 can be the fan blades 119C, themselves. For example, blades 119C can be made of the filtering material and can have a first coupling member, at its inwardly facing end, which is received by a cooperating coupling member on a hub attached to the rotation shaft of the motor 119B. Exemplary coupling members are corresponding pairs of, e.g., splines and channels, keys and keyways, and/or others. In such embodiments, the fan blades 119C require generally no cleaning or maintenance. Rather, upon being soiled, otherwise dirtied, or damaged, the user merely disposes of the used fan blades 119C and replaces them with new ones.

As desired, the device 100 can be provided with a mechanism, i.e., a default-off mechanism 134, which prevents energizing of fan motor 119B when the filter element 126 is not in place. The default-off mechanism 134 is used in, for example, embodiments in which the tray includes relatively large openings therethrough, to reduce the likelihood of non-desired objects falling through the tray and into the rotating blades 119C. The default-off mechanism 134 includes, for example, an electrical conductor on or in the filter element 126, which must be suitably positioned within the device 100 to close the electric circuit through the motor 119B, whereby, if the filter element is not properly in place, the motor 119B cannot be energized.

When the motor 119B is energized, the fan assembly 118 axially draws a volume of air downwardly through the housing upper portion 114. Furthermore, it pushes the volume of air axially down through the device 100, into the void 110 of the housing lower portion 104, where it is emitted through substantially the entire periphery of the housing lower portion 104 through the elongate apertures 117, i.e., in a 360-degree radius pattern from the device 100.

However, in some embodiments, the output flow from the lower portion 104 can be influenced or directed, as desired, by way of shroud 228. Thus, in situations where it is desired to limit the output airflow from the device 100 to a specified direction, such as directly towards an individual, the shroud 228 can be secured to the housing 102, preferably, slidably secured to sidewall 106. As one suitable configuration, shroud 228 is generally C-shaped, whereby the inwardly facing surface of shroud 228 and the outwardly facing surface of sidewall 106 face each other. The upper and lower edges of shroud 228 can be slidingly retained in arcuate upper and lower channels, respectively, of the housing lower portion 104.

In some implementations, shroud 228 operates to obstruct a majority of the elongate apertures 107, with the exception of a small number of apertures 107 disposed between opposed ends of the direction element 128. Thus, when the device 100 is in operation, airflow out of the device 100 is limited to the apertures 107 which remain unobstructed by the shroud 228. Since the shroud 228 is freely rotatable, or slidable, around the side wall 106 of the housing lower portion 104, the output airflow direction can be modified as desired.

As mentioned elsewhere herein, the device 100 need not be cylindrical, but can define other suitable configurations as well. Looking now at FIGS. 6-10, an alternative embodiment of the present invention is disclosed in which the device 200 includes a housing 202 that is triangularly shaped and includes a closed lower end 204 and a pair of solid, planar side walls 206. The housing 202 is preferably plastic and also includes a pair of apertured side walls 205 within which are disposed a number of apertures 207. The pairs of side walls 205 and 206 are each joined to one another by a cover 212 and the closed lower end 204 in order to define an interior 210 between the pairs of side walls 205 and 206, the cover 212, and the closed lower end 204.

Figure 9:
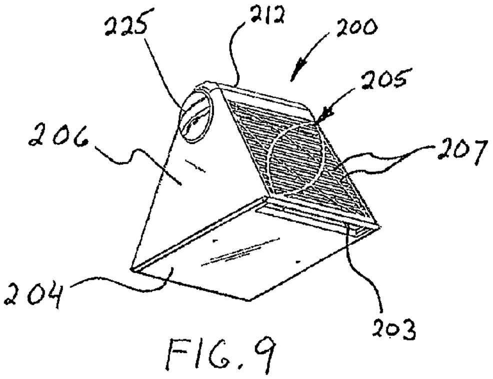
FIG. 9 is an isometric view of the filter housing within the device of FIG. 6.
Figure 10:
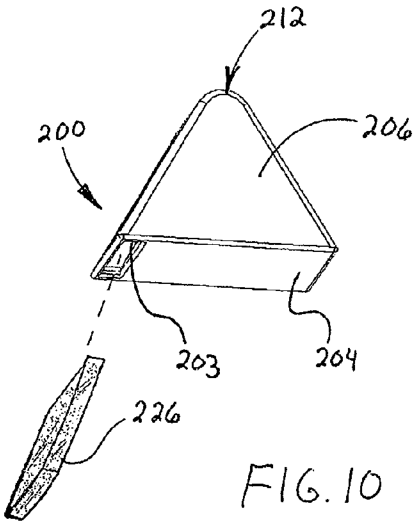
FIG. 10 is a perspective view illustrating the removal of the filter from the filter housing within the device of FIG. 6.

Referring now to FIGS. 7-10, adjacent the cover 212, the housing 202 includes a power source 224 removably disposed within a compartment 225 defined within the cover 212. The power source 224 is operably connected to a motor (not shown) that is used to operate a fan 218 disposed adjacent one of the apertured side walls 205. The fan 218 operates to draw air into the device 200 through one of the apertured side walls 205 and through a filter element 226 also disposed within the housing 202. The filter element 226 can be constructed of the same or similar materials to the filter element 126 of the previous embodiment and is located immediately adjacent one of the apertured side walls 205 opposite the fan 218. Further, as best shown in FIGS. 9 and 10, immediately adjacent the apertured side wall 205 against which the filter element 226 is positioned, the closed lower end 204 includes an opening 203 therein that allows for the filter element 226 to be inserted into and removed from the housing 202.

Referring now to the embodiments of FIGS. 1A-5, to use the device 100 of the invention, the user first installs a filter element 126, then positions the device 100, in the desired location, and finally turns the device 100 on. Referring to FIGS. 1A and 1B, to install the filter element 126, the user aligns tab 128 with depression 118, and inserts the filter element 126 into the top of the device 100, so that it rests upon the tray 114.

Referring to FIGS. 1B and 2B, to install the filter elements 126, in devices 100 with pivoting filter trays 114, the user opens the tray 114 by depressing the tab 355, pushing it through the opening 360, and urging the tab 355 toward tray 114. This enables the tab 355 to pass from a state of registration with opening 360, to being in front of slot 310. The user then pivots the tray 114 out through slot 310, and tab 355 slides past the side surface and through slot 310. The user then places the filter element 126 into the tray 114 and pivots it back through slot 310. As the tab 355 contacts the side surface of the slot 310, it flexes inwardly toward the tray 114 and slides past the of the side surface of the slot. Upon sliding completely past and clearing the channel side surface, the tab flexes, extends, and restores outwardly to its resting state position. At that point, the tab 355 is in alignment and registration with the opening 360, and it extends through and past the entire thickness dimension of housing upper portion sidewall 116, again extending out through the opening 360.

Referring to FIGS. 1C and 2C, to install filter elements 126 in devices 100 with tray projections 132, the user aligns tab 128 with depression 118, aligns aperture 130 with projection 132, and inserts the filter element 126 into the top of the device 100, so that it rests upon the tray 114. As required, and referring now to FIGS. 1D and 2D, in some devices 100, the cover 121 is first removed from the housing 102 before installing the filter element 126.

Thence, with filter installed, the user energizes the fan 119B whereby the device 100, 200 establishes a flow of air therethrough and a corresponding airflow pattern(s) near the device 100, 200, which are effective to influence the settling, floating, blowing, or other airborne traverse of various airborne particulates. Correspondingly, the localized settling or accumulation of such airborne particulates, adjacent device 100, 200 or otherwise in the respective effected zone, is mitigated or otherwise suitably decreased.

Figure 11:
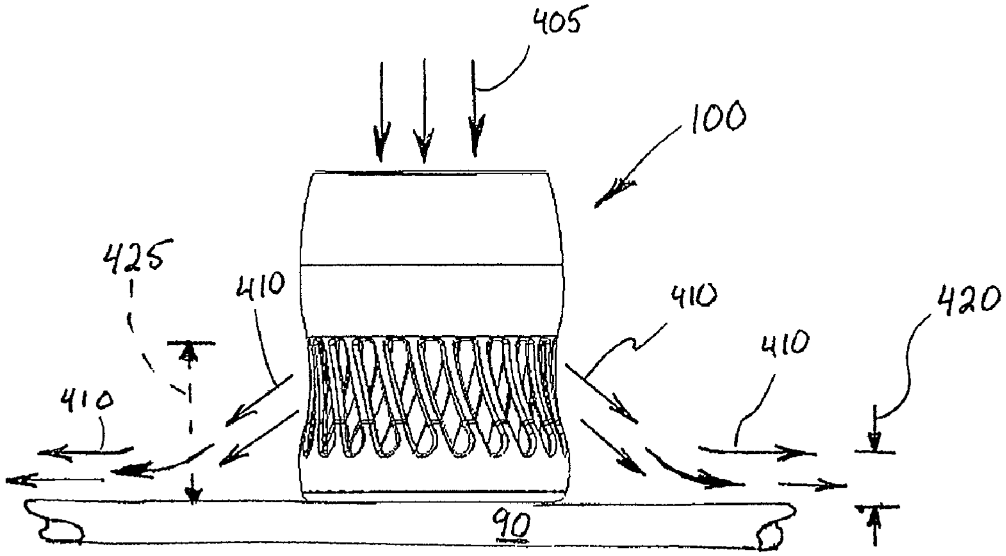
FIG. 11 is a side elevation view of the device of FIG. 1A, during use.
Figure 12:
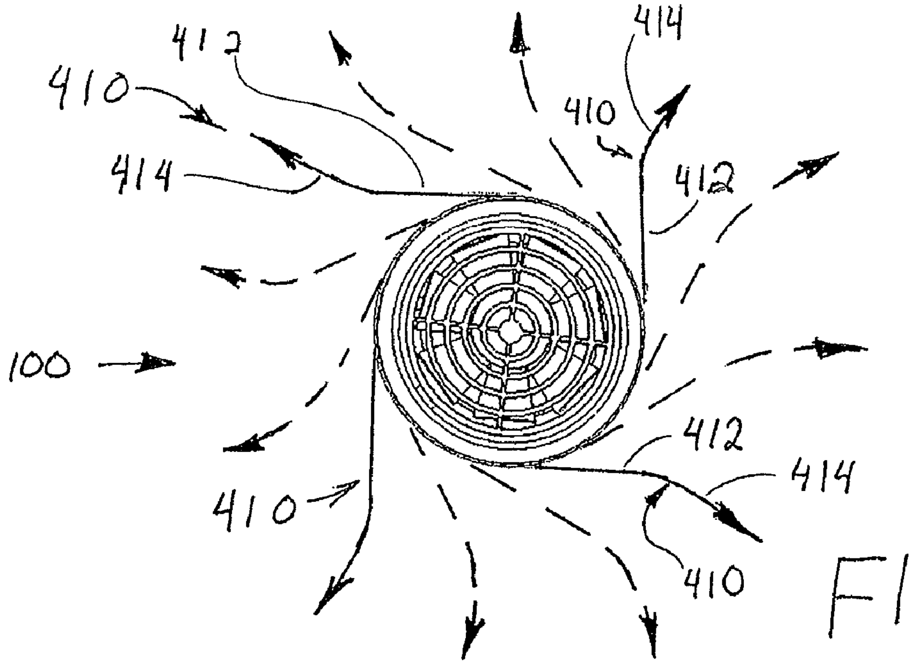
FIG. 12 is a top, plan, view of the device of FIG. 1A, during use.

FIGS. 11-12 show various suitable airflow patterns which effectuate the desired localized accumulation and settling mitigation of airborne particulates. The airflow patterns are defined by multiple individual output airflow components 410, which exit the multiple individual apertures 107, respectively. As seen in FIG. 11, fan assembly 118 generally axially draws an intake flow 405 of air into the device 100 from the top. Fan assembly 118 then pushes the volume of air axially down through the device 100, into the void 110 in the housing lower portion 104. The output airflow components 410 exit through the apertures 107, angularly toward the, e.g., supporting surface 90, be it a tabletop, desktop, countertop, or other support structure, as viewed from a side elevation. At least some of the airflow components 410 continue to skim across the supporting surface 90, whereby a generally annular boundary layer of flowing air is defined radiating outwardly from the device 100, across the supporting surface 90.

Such annular boundary layer of flowing air, during a substantial portion of its traverse across the device supporting surface 90, maintains a generally constant height at its upper portion, relative to the device supporting surface 90. Accordingly, in some implementations, the output or exhausting air radiating from the device 100 generally defines a flow thickness dimension 420, defined between the device supporting surface and the upper portion of the annular boundary layer of flowing air.

The annular boundary layer thickness dimension 420, in some implementations, is less than an aperture height dimension 425 which is defined between the device supporting surface 90 and the uppermost portion of the apertures 107 (seen in FIG. 11). The boundary layer thickness dimension 420 can be about 0.125 inch or less than about 0.2 inch, less than about 0.5 inch, less than about 1 inch, less than about 3 inches, less than about 6 inches, less than about 12 inches, or other thickness dimensions, as desired.

In other implementations, the annular boundary layer thickness dimension 420 has approximately the same magnitude as that of the aperture height dimension 425, whereby the airflow components 410 flow substantially radially from the entire length of the apertures 107. This flow pattern can be effectuated by, e.g., incorporating a "squirrel-cage" type fan, in addition to or in lieu of fan assembly 118, within the void 110 of lower portion 104 and thus concentrically within the circumferential sidewall 106. In such implementations, the annular boundary layer thickness dimension 420 can be less than about 2 inches, less than about 3 inches, less than about 6 inches, less than about 12 inches, or other thickness dimensions as desired.

Referring now to FIG. 12 as viewed from a top plan view, i.e., above the device 100, the output airflow components are emitted from substantially the entire periphery thereof. The output airflow components initially exit the device generally tangentially to the outer circumferential surface, defining a tangential flow segment 412. The volume of air exits the device 100 with an angular velocity of at least about 10 feet per second, at the tangential flow segment.

From the tangential flow segment, the airflow component 410 continues traveling generally radially outward therefrom, defining a radial flow segment 414. Since the airflow components 410 are emitted from substantially the entire periphery of the device 100, and since the components 410 are largely analogous to each other, the airflow pattern is generally radially symmetrical, and correspondingly exhibits azimuthal symmetry with respect to the housing lower portion 104.

It is apparent that the output airflow from the device 100 defines an initial, somewhat downwardly directed, spiral or swirl which circumferentially expands as it travels outwardly from the device 100. Eventually, the output airflow components 410 flow outwardly from the device 100 along a substantially radial path, whereby the output airflow in its entirety generally radiates outwardly from the device 100.

Correspondingly, the output airflow components 410, in combination, generally define a circumferentially expanding plane of air, which radiates outwardly, generally perpendicular to upright axis of rotation of the fan motor 119B. This circumferentially plane of air is effective to push or pull airborne particulates along with it, removing them from the immediate vicinity of the device 100. In addition, the circumferentially expanding plane of air influences the nearby volume of air, creating air current flows in like directions but having lower magnitudes of flow velocities. Nevertheless, such air current flows also move airborne particulates along therewith, radially away from the device 100.

As a result, device 100 creates a localized zone having relatively fewer airborne particles, i.e., within the area affected by the resultant airflow patterns. Thus, at least some of the airborne particles within such localized zone are transported out therefrom, and correspondingly settle or accumulate elsewhere. It is appreciated that the localized zone can be dynamically changed or redefined by the user, as desired. In other words, the user can reposition the device 100 elsewhere in the room or other personal area, upon a different supporting surface 90, or can use, e.g., utilize shroud 228 to dynamically redefine the affected localized zone. As one example, if the user does not desire the flow of air from the device 100 contacting his or her person, the user install shroud 228, or manipulates a previously installed shroud 228, optionally manipulates the device the device 100, so that the shroud 228 is radially aligned with or faces the user. After such manipulation, air continues to flow from the remainder of device 100 whilst no air flows through the shroud 228 and thus the user is generally not contacted with the flowing air, yet still enjoys the adjacent affected localized zone. In other words, as desired, shroud 228 can be used to guide or direct the output or exhausting air flow in a particular direction or path, instead of radiating from the entire periphery of the device 100.

Looking now at FIGS. 6-10, to use the somewhat triangular alternative embodiment devices 200, they are each operated by energizing the motor with the power source 224, whereby air is drawn into the housing 202 of the device 200 through the one of the pair of side walls 205 adjacent the fan 218. The air is then urged through the filter element 226 where at least some of the airborne particulates, which enter the device 200, are removed from the air by the filter element 226. The air is subsequently directed out of the device 200 through the opposite apertured side wall 205 and back into the surrounding environment. When the filter element 226 has become clogged with dust and other allergens as shown in FIG. 9, the filter element 226 can be removed from the device 200 through the opening 203 disposed in the closed lower end 104. A clean filter element 226 can then be slid into the device 200 and the device 200 can be repositioned and operated to continue to remove dust and other allergens from the surrounding air. Preferably, the device of the present invention is placed directly upon an object known to accumulate or collect various airborne particles such as dust, allergens, etc., for example, a table, a bed, sofa, chair, etc. in a particular room. The goal with such a device placement would be that the device could significantly minimize the amount of build-up or accumulation of settling airborne particles on such object.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Further, although various components, such as the filter element 126, described herein is a physically separate module, it will be manifest that the may be integrated into the apparatus with which it is associated. Furthermore, all the disclosed features of each disclosed embodiment can be combined with, or substituted for, the disclosed features of every other disclosed embodiment except where such features are mutually exclusive.

What is claimed is:

1. A device for mitigating accumulation and localized settling of airborne particulates, comprising:

a housing having an upper portion and a lower portion; the housing upper portion defining an air intake; and the housing lower portion defining an air outlet and having an outer periphery defined by at least one sidewall;

a filter element removably attached to at least one of the housing upper and lower portions; and a fan assembly mounted within the housing and defining an axis of rotation that is generally vertically oriented, wherein the fan axially draws a volume of air downwardly through the housing upper portion and discharges the volume of air into the housing lower portion, where it is emitted through substantially the entire periphery of the housing lower portion;

wherein the air outlet is configured such that the volume of air that is emitted by the air outlet is directed generally downwardly and radially from the housing to a surrounding surface so as to mitigate accumulation and localized settling of airborne particulates to the surrounding surface.

2. The device of claim 1, wherein the emitted air exits the housing lower portion initially as a tangential flow segment in which the air flows tangentially to the outer surface of the housing lower portion.

3. The device of claim 2, wherein the emitted air subsequently continues as a radial flow segment, which continues radially from the tangential flow segment.

4. The device of claim 1, wherein the emitted air defines a flow pattern having azimuthal symmetry with respect to the housing lower portion.

5. The device of claim 1, wherein the filter element further comprises written indicia on a visible surface thereof.

6. A device for mitigating accumulation and localized settling of airborne particulates, comprising:

a housing having an upper portion and a lower portion; the housing upper portion defining an air intake of the device; the housing lower portion having at least one sidewall that defines a length dimension, the length dimension being generally vertically oriented, and a width dimension which varies along the length dimension of the housing lower portion sidewall;

a filter element removably communicating with the upper wall of the housing; and a fan assembly which draws air into the device through the housing upper portion and pushes air out of the device through the housing lower portion;

wherein the housing lower portion of the device downwardly directs the air pushed out of the device toward a surface upon which the device is supported whereby the air pushes settled airborne particulate away from the surface surrounding device so as to mitigate accumulation thereof .

7. The device of claim 6, wherein the sidewall of the lower portion has an arcuate, inwardly tapering, portion.

8. The device of claim 6, wherein the at least one sidewall defines a circumferential sidewall extending upwardly from a perimeter of a generally circular bottom wall.

9. The device of claim 8, wherein a plurality of apertures extend through the circumferential sidewall, about a major portion of the perimeter of the circumferential sidewall.

10. The device of claim 9, wherein apertures are elongate and extend generally helically along the circumferential sidewall.

11. A device for mitigating accumulation and localized settling of airborne particulates, comprising:

a housing having an upper portion and a lower portion; the housing upper portion defining an air intake; and the housing lower portion defining an air outlet and having an outer periphery defined by at least one sidewall;

a filter element removably attached to at least one of the housing upper and lower portions;

a fan assembly mounted within the housing and defining an axis of rotation that is generally vertically oriented, and a shroud movably mounted to the housing;

wherein the fan axially draws a volume of air downwardly through the housing upper portion and discharges the volume of air into the housing lower portion, where it is emitted through substantially the entire outer periphery of the housing lower portion.

12. The device of claim 11, wherein the shroud rotatably slides with respect to an outer surface of the housing lower portion.

* * * * *